United States Patent
Ugaji et al.

(10) Patent No.: US 10,917,385 B1
(45) Date of Patent: Feb. 9, 2021

(54) SHARING MATCHING FILTERS AMONG INTERFACES OF A NETWORK DEVICE

(71) Applicant: Juniper Networks, Inc., Sunnyvale, CA (US)

(72) Inventors: Shivayogi Ugaji, Sunnyvale, CA (US); Robin N. Maleche, Sunnyvale, CA (US); Saravanan Deenadayalan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 270 days.

(21) Appl. No.: 15/859,121

(22) Filed: Dec. 29, 2017

Related U.S. Application Data

(60) Provisional application No. 62/593,063, filed on Nov. 30, 2017.

(51) Int. Cl.
*H04L 29/06* (2006.01)
*H04L 12/813* (2013.01)

(52) U.S. Cl.
CPC ...... *H04L 63/0263* (2013.01); *H04L 63/0236* (2013.01); *H04L 63/0245* (2013.01); *H04L 63/0272* (2013.01); *H04L 47/20* (2013.01); *H04L 63/166* (2013.01)

(58) Field of Classification Search
None
See application file for complete search history.

(56) References Cited

U.S. PATENT DOCUMENTS

| 8,948,174 B2 | 2/2015 | Szyszko et al. | |
| 2013/0007257 A1* | 1/2013 | Ramaraj | H04L 63/0263 709/224 |
| 2018/0063187 A1* | 3/2018 | St. Pierre | H04L 63/1458 |

OTHER PUBLICATIONS

"Routing Policies, Firewall Filters, and Traffic Policers Feature Guide," Junos OS, Juniper Networks, Inc., Aug. 22, 2017, 1646 pp.
Herrero et al., "Network mergers and Migrations—Dealing with Routes within a Junos OS Based Router," John Wiley & Songs, Ltd., Apr. 20, 2010, 60 pp.

\* cited by examiner

*Primary Examiner* — Andrew J Steinle
(74) *Attorney, Agent, or Firm* — Shumaker & Sieffert, P.A.

(57) ABSTRACT

A network device includes match filters to be applied to packets transiting two or more network interfaces. In one example, a network device includes a filtering unit configured to apply one or more filters to a first packet transiting a first network interface to determine a first rule the first packet matches, send the first packet and data representing the first network interface to a first accounting filter associated with the first rule, apply the filters to a second packet transiting a second network interface to determine a second rule that the second packet matches, the second packet being different than the first packet, and the second network interface being different than the first network interface, and send the second packet and second data representing the second network interface to a second accounting filter associated with the second rule.

19 Claims, 3 Drawing Sheets

SHARING MATCHING FILTERS AMONG INTERFACES OF A NETWORK DEVICE

This application claims the benefit of U.S. provisional application No. 62/593,063, filed Nov. 30, 2017, the entire contents of which are hereby incorporated by reference.

TECHNICAL FIELD

This disclosure relates to computer networks and, more particularly, to filtering packets exchanged via computer networks.

BACKGROUND

A computer network generally includes a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are transmitted between the source device and destination device using intermediate network devices, such as gateways, firewalls, switches and routers. When a network device receives an incoming packet or sends an outgoing packet, the network device may apply one or more filters to the packet to perform a defined action on the packet under certain conditions. In order to identify the terms of the filters to apply to a given packet, the network device may extract information from the packet, such as a source or destination Internet Protocol (IP) address, a source or destination port, and protocol. The network device then performs a search of the filter terms installed within the network device to determine whether the extracted information satisfies criteria specified by any of the filter terms.

A network device may include many different network interfaces, e.g., physical network ports and logical network interfaces configured for the ports. Such logical network interfaces may include virtual local area networks (VLANs), layer 3 (routed) interfaces, and routed VLAN interfaces, for instance. In some conventional implementations, each network interface may be associated with a set of filters to apply to packets received via the corresponding network interface. In the conventional implementations, separate filters are configured for each network interface on a per-network interface basis. Moreover, counters, which count numbers of packets forwarded or dropped, and policers, which enforce rules associated with matching criteria, are typically associated with respective network interfaces by which packets are received as well.

SUMMARY

In general, this disclosure describes techniques for reducing memory consumption by, match filters for network devices. In general, network devices apply match filters (or matching filters) each having one or more match conditions based on packet header fields (e.g., IP, TCP, UDP, and/or ICMP header fields) of packets to determine policies applicable to the packets. The policies (also referred to as rules) may indicate whether to forward or drop the packets. Rather than specifying matching filters for each network interface of a network device, this disclosure describes techniques for specifying match filters collectively for the network interfaces. In this manner, if a large number of match filters are specified for the network interfaces, and the match filters are the same for the network interfaces, memory consumed by the match filters can be reduced. That is, redundant storage of the same match filters can be avoided, thereby allowing a greater number of match filters to be stored.

In one example, a method includes applying, by a filtering unit of a network device, one or more filters to a first packet transiting a first network interface of the network device to determine a first rule that the first packet matches, sending, by the filtering unit, the first packet and first data representative of the first network interface to a first accounting filter associated with the first rule, applying, by the filtering unit, the one or more filters to a second packet transiting a second network interface of the network device to determine a second rule that the second packet matches, the second packet being different than the first packet, and the second network interface being different than the first network interface, and sending, by the filtering unit; the second packet and second data representative of the second network interface to a second accounting filter associated with the second rule.

In another example, a network device includes a plurality of network interfaces implemented in circuitry and configured to send and receive packets to and from a network, a plurality of accounting filters implemented in circuitry, each of the accounting filters being associated with a respective rule of a plurality of rules, and a filtering unit implemented in circuitry and configured to apply one or more filters to a first packet transiting a first network interface of the network interfaces to determine a first rule of the plurality of rules that the first packet matches, send the first packet and first data representative of the first network interface to a first accounting filter of the accounting filters associated with the first rule, apply the one or more filters to a second packet transiting a second network interface of the network interfaces to determine a second rule of the plurality of rules that the second packet matches, the second packet being different than the first packet, and the second network interface being different than the first network interface, and send the second packet and second data representative of the second network interface to a second accounting filter of the accounting filters associated with the second rule.

In another example, a computer-readable medium, such as a computer-readable storage medium, has stored thereon instructions that, when executed, cause a processor to apply one or more filters to a first packet transiting a first network interface of the network device to determine a first rule that the first packet matches, send the first packet and first data representative of the first network interface to a first accounting filter associated with the first rule, apply the one or more filters to a second packet transiting a second network interface of the network device to determine a second rule that the second packet matches, the second packet being different than the first packet, and the second network interface being different than the first network interface, and send the second packet and second data representative of the second network interface to a second accounting filter associated with the second rule.

The details of one or more examples are set forth in the accompanying drawings and the description below. Other features, objects, and advantages will be apparent from the description and drawings, and from the claims.

DETAILED DESCRIPTION

Figure 1:
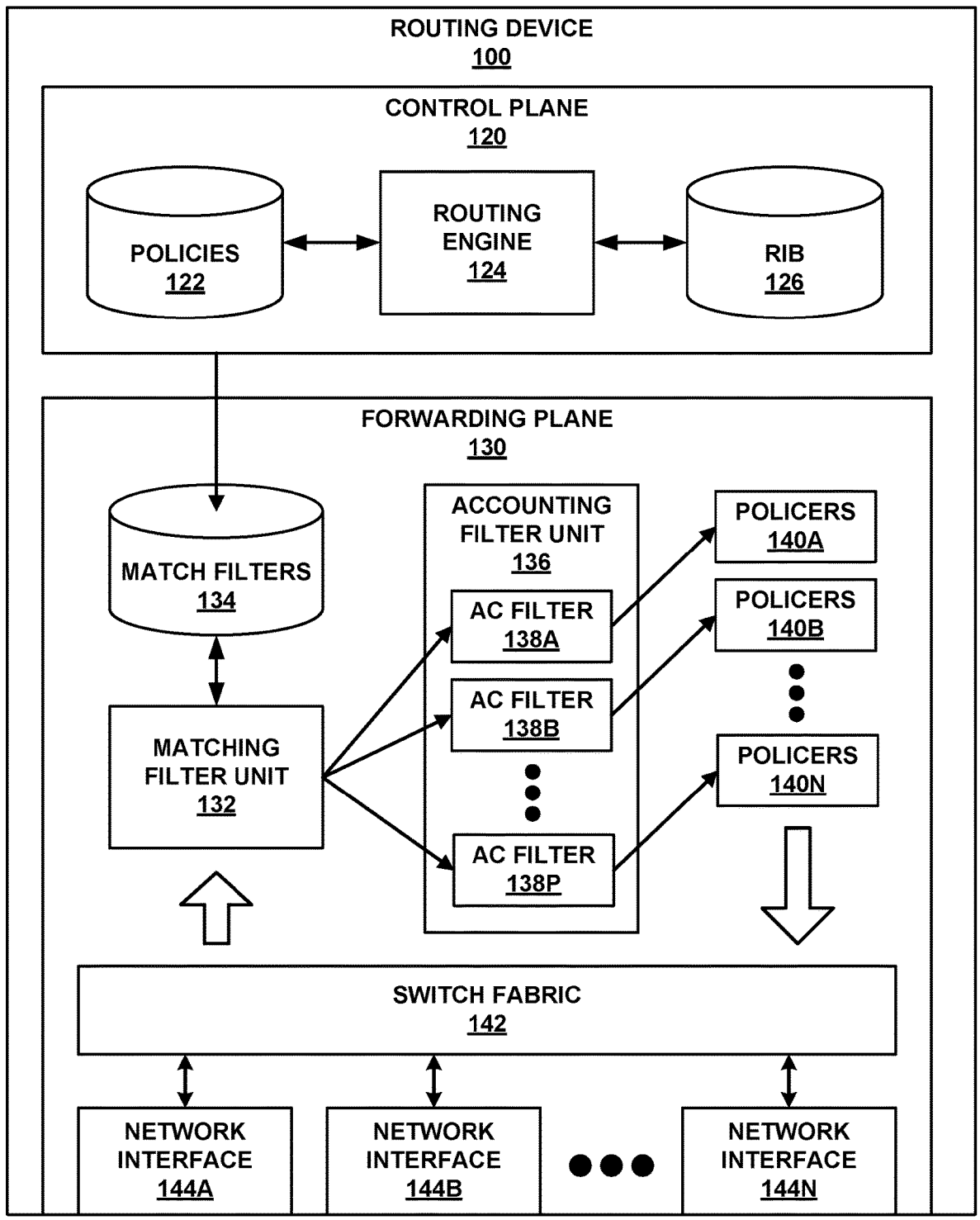
FIG. 1 is a block diagram illustrating an example network device that may perform the techniques of this disclosure.

FIG. 1 is a block diagram illustrating an example network device that may perform the techniques of this disclosure. In this example, the network device is a routing device 100 includes control plane 120 and forwarding plane 130. Control plane 120 includes policies 122, routing engine 124, and routing information base (RIB) 126. Forwarding plane 130 includes match filters 134, matching filter unit 132, accounting filter unit 136, policers 140A-140N (policers 140), switch fabric 142, and network interfaces 144A-144N (network interfaces 144). Although primarily described with respect to a routing device e.g., a router), the techniques are similarly applicable to other types of network devices, such as real or virtual switches, as well as firewalls or other security devices, for example. Although network interfaces 144 as shown portray physical network interfaces, it should be understood that the techniques of this disclosure may also be applied, additionally or alternatively, when packets are transited via logical interfaces as well.

As shown in FIG. 1, the elements of routing device 100 are divided between control plane 120 and forwarding plane 130. In general, elements of control plane 120 perform control functions for routing device 100, whereas forwarding plane 130 (sometimes also referred to as a data plane) includes components for processing and forwarding packets according to the results of the control functions. For example, routing engine 124 may execute one or more routing protocols to discover routes through a network, such as the Internet. Such routing protocols may include, for example, Border Gateway Protocol (BGP), Routing Information Protocol (RIP), Interior Gateway Routing Protocol (IGRP), Open Shortest Path First (OSPF), Exterior Gateway Protocol (EGP), Intermediate System-to-Intermediate System (IS-IS), or the like.

By executing such routing protocols, routing engine 124 may discover routes through the network to reach particular destinations in the network. Routing engine 124 may determine which of the routes has a lowest cost to reach the destination. Routing engine 124 also determines a device communicatively coupled to routing device 100 via network interfaces 144 to which to forward packets in order to reach the destination. Such a device may be referred to as a "next hop." Routing engine 124 may then construct forwarding information specifying associations between destination network addresses (e.g., Internet Protocol (IP) addresses) of destinations in the network, and network interfaces 144 by which to forward packets to reach the destinations. Routing engine 124 may program a forwarding information base (FIB) (not shown) in forwarding plane 130 to store this forwarding information. A forwarding engine (not shown) may forward packets according to the forwarding information. In various examples, policers 140 may be communicatively coupled to the forwarding engine, each of policers 140 may include a forwarding engine, or each of policers 140 may be configured to act as a respective forwarding engine. The forwarding engine may be communicatively coupled to memory storing the FIB.

As another example, policies 122 of control plane 120 generally define policies for either dropping or forwarding packets, e.g., based on one of network interfaces 144 that received a packet, one of network interfaces 144 by which the packet is to be sent, a source address (e.g., IP address), and/or a destination address (e.g., IP address), or other such information for the packet. Policies 122 may generally indicate that packets destined for a particular IP address (or a range of IP addresses, e.g., an IP subnetwork defined by a network mask or prefix) are either to be forwarded or dropped. Routing device 100 may receive policies 122 from a user, such as an administrator.

In general, policers 140 perform actions associated with policies 122, e.g., dropping packets or permitting packets to be forwarded. Policers 140 may also count numbers of packets forwarded and/or dropped according to policies 122 for each of network interfaces 144. Policers 140 are each associated with respective AC filters 138. For example, policers 140A corresponds to AC filter 138A, policers 140B corresponds to AC filter 13813, and so on.

Routing engine 124 may program forwarding plane 130 with match filters 134 and policers 140 based on policies 122. For example, one of policies 122 may define an IP address or range of IP addresses, such as a network mask (e.g., 192.168.1.0/24), as a destination address for a packet transiting (e.g., received from and/or being sent to) a particular one of network interfaces 144 (e.g., network interface 144A), and an action to take (e.g., drop). Packets received at multiple different network interfaces 144 to ingress network device 100 may transit a single outbound network interface 144 to egress the network device 100. Similarly, packets received at a single network interface 144 to ingress network device may transit multiple outbound network interfaces 144. Forwarding plane 130 applies filters 134, 138 at the ingress for packets transiting inbound network interfaces 144. Forwarding plane 130 applies filters 134, 138 at the egress for packets transiting outbound network interfaces 144.

Accordingly, routing engine 124 may define a corresponding matching filter of "192.168.1.0/24" as one of match filters 134. Thus, each of match filters 134 may represent one or more rules, where the rules may each express a respective prefix or IP address for the rule.

Match filters 134 may be stored in a computer-readable storage medium, such as random access memory (RAM), read only memory (ROM), programmable read only memory (PROM), erasable programmable read only memory (EPROM), electronically erasable programmable read only memory (EEPROM), flash memory, or the like. In accordance with the techniques of this disclosure, match filters 134 are shared among network interfaces 144. That is, matching filter unit 132 may apply the same match filters 134 to packets transiting any or all of network interfaces 144. Thus, as opposed to having individual sets of match filters each associated with a different one of network interfaces 144, any one or more of match filters 134 may be applied to multiple network interfaces 144, In this manner, memory resources may be conserved when the same match filters are applied to packets transiting multiple different network interfaces 144. Accordingly, a relatively larger number of match filters 134 may be stored and applied to packets, as opposed to implementations in which individual match filters are provided for each of network interfaces 144.

Routing engine 124 also programs forwarding plane 130 to include a set of accounting filters 138A-138P (accounting (AC) filters 138) as part of accounting filter unit 136. AC filters 138 each correspond to one of policies 122 (also referred to as rules). Accordingly, when matching filter unit 132 receives a packet from one of network interfaces 144, matching filter unit 132 applies match filters 134 to the packet to determine one of policies 122 to apply to the packet. When an address of the packet matches one of match filters 134, matching filter unit 132 sends the packet and data representing the one of network interfaces 144 by which the packet was received or is to be transmitted to a corresponding one of AC filters 138. When two or more of match filters 134 matches the destination address of the packet, matching filter unit 132 may determine that the one of match filters 134 having the longest prefix matched by the destination address of the packet is the best match. That is, matching filter unit 132 may perform a longest prefix match algorithm.

Accounting filter unit 136, in turn, applies the one of AC filters 138 to the data representing the one of network interfaces 144 by which the packet was received. AC filters 138 are configured to forward the packet and data representing the one of policies 122 to apply to the packet to the corresponding one of policers 140. In general, each of policers 140 represents a set of policers, each associated with one of network interfaces 144. In this manner, each of the policers may include counters for packets forwarded and dropped associated with each of network interfaces 144.

As noted above, policers 140 apply the action associated with the one of policies 122 that a received packet matches and the one of network interfaces 144 by which the packet was received to the packet. For example, policers 140 may drop a packet or forward the packet to one of network interfaces 144 communicatively coupled to a next hop of a route to reach the destination of the packet via switch fabric 142. Moreover, policers 140 may increment counters representative of whether the packet was dropped or forwarded. Routing engine 124 or another element of control plane 120 may configure policers 140 to perform various policing actions (e.g., dropping or forwarding packets) based on which of network interfaces 144 received the packet and which of match filters 134 the packet matched. Assuming a corresponding one of policies 122 indicates that the packet is to be forwarded, policers 140 may send the packet to one of network interfaces 144 via switch fabric 142 to be forwarded according to forwarding information of forwarding plane 130.

The various components of routing device 120 (e.g., routing engine 124, matching filter unit 132, accounting filter unit 136, and policers 140) may be implemented in hardware, software, firmware, or a combination thereof. When functionality attributed to these components is implemented in software or firmware, it is presumed that requisite hardware is provided to store instructions of the software or firmware (e.g., memory) as well as processing circuitry to execute the instructions. The memory may be any sort of computer-readable storage medium, such as read only memory (ROM), programmable read only memory (PROM), erasable programmable read only memory (EPROM), electronically erasable programmable read only memory (EEPROM), flash memory, a hard disk, or the like. Processing circuitry may include one or more digital logic circuits, such as microprocessors, digital signal processors (DSPs), application specific integrated circuits (ASICs), field programmable gate arrays (FPGAs), or any other equivalent integrated or discrete logic circuitry, as well as any combinations of such components.

As discussed above, policies 122 may indicate whether a packet is to be dropped or forwarded when the packet matches a match filter associated with the corresponding one of the policies. However, in other examples, policies 122 may indicate one or more other actions, such as one or more of appending a label to the packet (for multiprotocol label switching (MPLS) to tunnel the packet), removing or swapping a label on the packet, inspecting the packet for viruses, performing deep packet inspection on the packet, performing quality of service processing on the packet (e.g., prioritizing the packet over other packets), blocking or dropping the packet (e.g., when the source or destination associated with the packet have been determined to be malicious) or other services.

Moreover, forwarding plane 130 may include forwarding information that defines next hops for packets corresponding to logical interfaces. For example, the forwarding information may define matching filter unit 132 as a next hop for packets received via network interfaces 144. Furthermore, the forwarding information may define AC filters 138 as next hops from matching filter unit 132, and policers 140 as next hops from AC filters 138. Forwarding plane 130 may accordingly send packets among the various internal units shown in FIG. 1 according to the forwarding information. Additional details regarding the use of forwarding information defining next hops to internal components using logical interfaces can be found in, e.g., Szyszko et al., "VARIABLE-BASED FORWARDING PATH CONSTRUCTION FOR PACKET PROCESSING WITHIN A NETWORK DEVICE," U.S. application Ser. No. 13/172,505, filed Jun. 29, 2011, the entire contents of which are hereby incorporated by reference.

Figure 2:
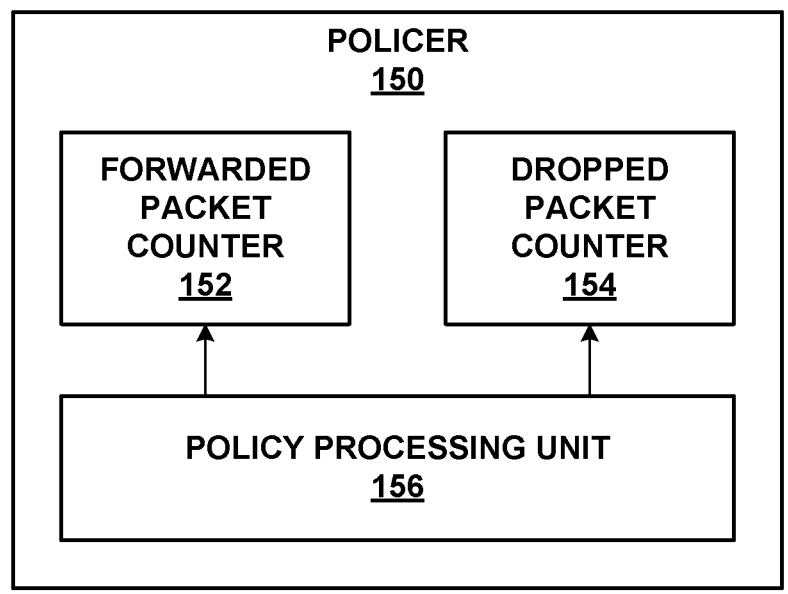
FIG. 2 is a block diagram illustrating an example set of components of a policer.

FIG. 2 is a block diagram illustrating an example set of components of policer 150. Each of policers 140 of FIG. 1 may include components similar to those of policer 150. In this example, policer 150 includes forwarded packet counter 152, dropped packet counter 154, and policy processing unit 156.

In general, policy processing unit 156 may determine whether to forward or drop a packet, based on one of policies 122 (FIG. 1) that the packet matched and one of network interfaces 144 (FIG. 1) by which the packet was received. In response to determining that the packet matched a policy indicating that the packet is to be forwarded, policy processing unit 156 increments forwarded packet counter 152 and forwards the packet to one of network interfaces 144 according to forwarding information configured by routing engine 134 (FIG. 1). On the other hand, if the packet matched a policy indicating that the packet is to be dropped, policy processing unit drops the packet (i.e., prevents the packet from being forwarded) and increments dropped packet counter 154.

Furthermore, at various times, policer 150 may provide data representing values of forwarded packet counter 152 and dropped packet counter 154, e.g., to a reporting unit (not shown). The reporting unit may generate a report for a user (such as an administrator) representing numbers of packets dropped and/or forwarded by each of network interfaces 144. The user may determine updates to policies 122, e.g., additional policies or modifications to existing policies, based on these reports. For example, if a large number of packets is being forwarded to a particular IP address or subnetwork representative of a flood attack, the user may generate a policy indicating that packets being forwarded to that IP address or subnetwork are to be dropped.

Figure 3:
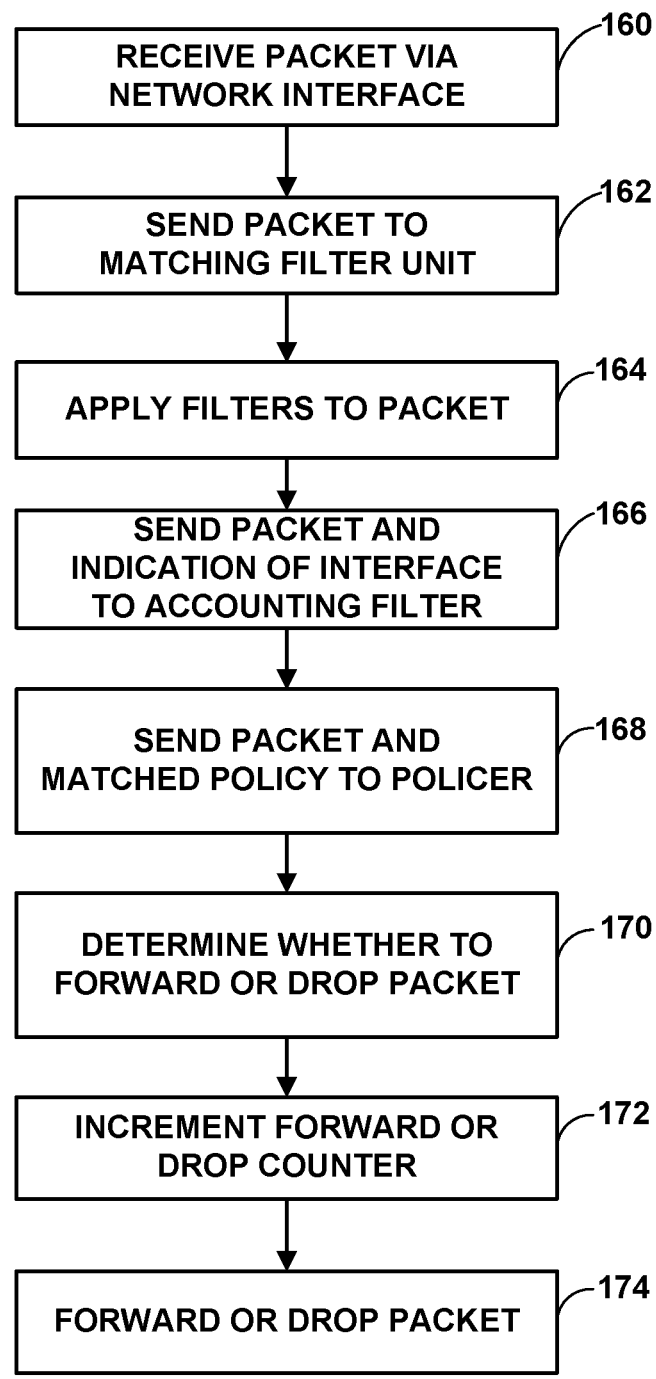
FIG. 3 is a flowchart illustrating an example method for match filtering packets according to the techniques of this disclosure.

FIG. 3 is a flowchart illustrating an example method for match filtering packets according to the techniques of this disclosure. The method of FIG. 3 is explained with respect to the components of routing device 100 of FIG. 1. However, it should be understood that other network devices, such as other routing devices or other types of network devices, may be configured to perform the method of FIG. 3, or a conceptually similar method.

Initially, routing device 100 receives a packet via one of network interfaces 144 (160), e.g., network interface 144A. Network interface 144A sends the packet to matching filter unit 132 via switch fabric 142 (162). Matching filter unit 132 applies one or more of match filters 134 to the packet (164), to determine which of the filters the packet (e.g., a destination IP address of the packet) matches.

After determining one of the match filters that the packet matches, matching filter unit 132 sends the packet and an indication of the network interface via which the packet was received (in this example, network interface 144A) to accounting filter unit 136 (166). Accounting filter unit 136 applies one of AC filters 138 to the indication of the network interface via which the packet was received to determine one of the set of corresponding policers 140 to which to send the packet and data representing which of policies 122 the packet matched, and then sends the packet and the data to the one of the set of policers 140 (168). In particular, accounting filter unit 136 determines one of AC filters 138 that corresponds to the one of policies 122 that the packet matched. For example, if the packet matched a policy associated with AC filter 138A, accounting filtering unit 136 would apply AC filter 138A to the indication of network interface 144A to select one of policers 140A corresponding to network interface 144A, and then send the packet and data representing the policy that the packet matched to the one of policers 140A.

The one of policers 140 then determines whether to forward or drop the packet (170) based on the received indication of the policy that the packet matched and the one of network interfaces 144 by which the packet was received, which corresponds to the one of policers 140. That is, as discussed above, each set of policers 140 corresponds to one of AC filters 138, and each set of policers 140 includes policers corresponding to respective network interfaces 144. Thus, the one of policers 140 may be configured to either forward or drop packets based on the one of policies 122 (i.e., one of match filters 134) that the packets match. Continuing the example above, the one of policers 140A may determine whether forward or drop the packet based on the one of the policies that the packet matched.

The one of the set of policers 140 also increments a corresponding forwarded packet counter or dropped packet counter (172) based on the matched policy. That is, if the policy indicates that the packet is to be forwarded, the one of the set of policers MO increments the forwarded packet counter, whereas if the policy indicates that the packet is to be dropped, the one of policers 140 increments the dropped packet counter. Each of the sets of policers 140 may have an associated set of counters, e.g., as shown in FIG. 2. Thus, each politer of the sets of policers 140 may maintain forwarded and dropped packet counters for respective network interfaces 144.

Moreover, policers 140 may forward or drop the packet (174) based on the matched policy. That is, if the policy indicates that the packet is to be forwarded, the one of the set of policers 140 forwards the packet to one of network interfaces 144 based on forwarding information via switch fabric 142, whereas if the policy indicates that the packet is to be dropped, the one of the set of policers 140 drops the packet.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   applying, by a filtering unit of a network device, one or more filters to a first packet transiting a first network interface of the network device to determine a first rule that the first packet matches;
   determining, by the filtering unit, a first logical interface by which to forward the first packet according to the first rule, the first logical interface being defined by forwarding information of the network device as a first next hop corresponding to a first accounting filter associated with the first rule, the first accounting filter being different than the one or more filters, and the first accounting filter being within the network device;
   sending, by the filtering unit, the first packet and first data representative of the first network interface to the first accounting filter associated with the first rule via the first logical interface;
   applying, by the filtering unit, the one or more filters to a second packet transiting a second network interface of the network device to determine a second rule that the second packet matches, the second packet being different than the first packet, and the second network interface being different than the first network interface;

determining, by the filtering unit, a second logical interface by which to forward the second packet according to the second rule, the second logical interface being defined by the forwarding information of the network device as a second next hop corresponding to a second accounting filter associated with the second rule, the second accounting filter being different than the one or more filters, and the second accounting filter being within the network device; and sending, by the filtering unit, the second packet and second data representative of the second network interface to the second accounting filter associated with the second rule via the second logical interface.

2. The method of claim 1, wherein the filtering unit is configured to operate in a forwarding plane of the network device, and wherein the forwarding plane is separate from a control plane of the network device.

3. The method of claim 1, wherein the first accounting filter and the second accounting filter are configured to operate in a forwarding plane of the network device, and wherein the forwarding plane is separate from a control plane of the network device.

4. The method of claim 1, further comprising:
sending, by the first accounting filter, the first packet to a first policer unit associated with the first network interface using the first data to cause the first policer unit to, in response to receiving the first packet, enforce the first rule and increment a first counter associated with the first rule; and
sending, by the second accounting filter, the second packet to a second policer unit associated with the second network interface using the second data to cause the second policer unit to, in response to receiving the second packet, enforce the second rule and increment a second counter associated with the second rule.

5. The method of claim 4, wherein the first counter represents one of a number of packets dropped as a result of enforcing the first rule or a number of packets forwarded as a result of enforcing the first rule, and wherein the second counter represents one of a number of packets dropped as a result of enforcing the second rule or a number of packets forwarded as a result of enforcing the second rule.

6. The method of claim 4, further comprising:
in response to the first rule indicating that the first packet can be forwarded, determining, by the first policer unit, a third network interface to which to send the first packet according to a forwarding information base (FIB) and the first data representative of the first network interface and sending the first packet to the third network interface to cause the third network interface to forward the first packet; and
in response to the second rule indicating that the second packet can be forwarded, determining, by the second policer unit, a fourth network interface to which to send the second packet according to the FIB and the second data representative of the second network interface and sending the second packet to the fourth network interface to cause the fourth network interface to forward the second packet.

7. The method of claim 1, wherein the first rule and the second rule comprise the same rule.

8. The method of claim 1, wherein the first rule is different than the second rule.

9. The method of claim 1, wherein the one or more filters consists of a single filter associated with the first rule and the second rule.

10. The method of claim 9, wherein the first rule is different than the second rule.

11. A network device comprising:
a plurality of network interfaces implemented in circuitry and configured to send and receive packets to and from a network;
a plurality of accounting filters implemented in circuitry, each of the accounting filters being associated with a respective rule of a plurality of rules;
a memory storing forwarding information defining a plurality of logical interfaces by which to forward packets as a respective plurality of next hops corresponding to the accounting filters; and
a filtering unit implemented in circuitry and configured to:
apply one or more filters, separate from the plurality of accounting filters, to a first packet transiting a first network interface of the network interfaces to determine a first rule of the plurality of rules that the first packet matches;
determine a first logical interface of the logical interfaces by which to forward the first packet according to the first rule, the first logical interface being defined by the forwarding information as a first next hop of the next hops corresponding to a first accounting filter of the accounting filters and associated with the first rule;
send the first packet and first data representative of the first network interface to the first accounting filter associated with the first rule via the first logical interface;
apply the one or more filters to a second packet transiting a second network interface of the network interfaces to determine a second rule of the plurality of rules that the second packet matches, the second packet being different than the first packet, and the second network interface being different than the first network interface;
determine a second logical interface of the logical interfaces by which to forward the second packet according to the second rule, the second logical interface being defined by the forwarding information as a second next hop of the next hops corresponding to a second accounting filter of the accounting filters and associated with the second rule; and
send the second packet and second data representative of the second network interface to the second accounting filter associated with the second rule via the second logical interface.

12. The network device of claim 11, wherein the network device comprises a router.

13. The network device of claim 11, wherein the filtering unit is configured to operate in a forwarding plane of the network device, and wherein the forwarding plane is separate from a control plane of the network device.

14. The network device of claim 11, wherein the first accounting filter and the second accounting filter are configured to operate in a forwarding plane of the network device, and wherein the forwarding plane is separate from a control plane of the network device.

15. The network device of claim 11, further comprising a plurality of policer units implemented in circuitry, each of the policer units being associated with a respective one of the network interfaces.

16. The network device of claim 15,
wherein the first accounting filter is configured to send the first packet to a first policer unit of the policer units associated with the first network interface using the first data to cause the first policer unit to, in response to receiving the first packet, enforce the first rule and increment a first counter associated with the first rule, and
wherein the second accounting filter is configured to send the second packet to a second policer unit of the policer units associated with the second network interface using the second data to cause the second policer unit to, in response to receiving the second packet, enforce the second rule and increment a second counter associated with the second rule.

17. The network device of claim 16, wherein the first counter represents one of a number of packets dropped as a result of enforcing the first rule or a number of packets forwarded as a result of enforcing the first rule, and wherein the second counter represents one of a number of packets dropped as a result of enforcing the second rule or a number of packets forwarded as a result of enforcing the second rule.

18. The network device of claim 16, further comprising a memory storing a forwarding information base (FIB),
wherein the first policer unit is configured to, in response to the first rule indicating that the first packet can be forwarded:
determine a third network interface to which to send the first packet according to the FIB and the first data representative of the first network interface, and
send the first packet to the third network interface to cause the third network interface to forward the first packet, and
wherein the second policer unit is configured to, in response to the second rule indicating that the second packet can be forwarded:
determine a fourth network interface to which to send the second packet according to the FIB and the second data representative of the second network interface, and
send the second packet to the fourth network interface to cause the fourth network interface to forward the first packet.

19. A computer-readable storage medium having stored thereon instructions that, when executed, cause one or more processors of a network device to:
apply one or more filters to a first packet transiting a first network interface of the network device to determine a first rule that the first packet matches;
determine a first logical interface by which to forward the first packet according to the first rule, the first logical interface being defined by forwarding information of the network device as a first next hop corresponding to a first accounting filter associated with the first rule, the first accounting filter being different than the one or more filters, and the first accounting filter being within the network device;
send the first packet and first data representative of the first network interface to the first accounting filter associated with the first rule via the first logical interface;
apply the one or more filters to a second packet transiting a second network interface of the network device to determine a second rule that the second packet matches, the second packet being different than the first packet, and the second network interface being different than the first network interface;
determine a second logical interface by which to forward the second packet according to the second rule, the second logical interface being defined by the forwarding information of the network device as a second next hop corresponding to a second accounting filter associated with the second rule, the second accounting filter being different than the one or more filters, and the second accounting filter being within the network device; and
send the second packet and second data representative of the second network interface to the second accounting filter associated with the second rule via the second logical interface.

* * * * *